United States Patent [19]
Jann et al.

[11] Patent Number: 5,665,361
[45] Date of Patent: Sep. 9, 1997

[54] INCREASING FREEZING POINT OF FOOD WITH SEA BUCKTHORN ICE NUCLEATING AGENT

[75] Inventors: Alfred Jann, Marin-Thonon, France; Rolv Lundheim, Trondheim, Norway; Peter Niederberger, Epalinges; Michel Richard, Peney-le-Jorat, both of Switzerland

[73] Assignee: Nestec S.A., Vevey, Switzerland

[21] Appl. No.: 673,261

[22] Filed: Jun. 28, 1996

Related U.S. Application Data

[62] Division of Ser. No. 344,210, Nov. 23, 1994.

[30] Foreign Application Priority Data

Dec. 11, 1993 [EP] European Pat. Off. ............ 93120039

[51] Int. Cl.⁶ .................................................. A61K 35/78
[52] U.S. Cl. ........................................ 424/195.1; 426/524
[58] Field of Search ........................ 426/524; 424/195.1

[56] References Cited

U.S. PATENT DOCUMENTS

| 4,464,473 | 8/1984 | Orser et al. ................ 435/172.3 |
| 5,194,269 | 3/1993 | Lee ................................ 426/61 |

FOREIGN PATENT DOCUMENTS

| 0138426 | 4/1985 | European Pat. Off. ........ C12N 15/00 |
| 0424771 | 5/1991 | European Pat. Off. .......... A23L 3/36 |
| WO9222581 | 6/1992 | WIPO ............................. C07K 15/10 |

OTHER PUBLICATIONS

Arai, et al., "Freeze Texturing of Food Materials by Ice-Nucleation with the Bacterium *Erwinia ananas*," Agric. Biol. Chem. vol. 50(1), pp. 169–175 (1986).

Ryder, "Biogenic Ice Nucleators In Freezing of Fish," University of Rhode Island Dissertation (1987).

Chemical Abstracts, 107:55 pp. 72426, (1987).

Chemical Abstracts 108:209910k, (1988).

*Primary Examiner*—John W. Rollins
*Attorney, Agent, or Firm*—Vogt & O'Donnell, LLP

[57] ABSTRACT

The freezing point of a food product subjected to freezing temperatures is increased by adding to the food product a juice obtained from berries of sea buckthorn or an aqueous extract obtained from sea buckthorn berry or leaf tissue. The food product containing the added sea buckthorn substance is then cooled to freeze the product.

16 Claims, 1 Drawing Sheet

INCREASING FREEZING POINT OF FOOD WITH SEA BUCKTHORN ICE NUCLEATING AGENT

CROSS REFERENCE TO RELATED APPLICATION

This application is a divisional application of application Ser. No. 08/344,210, filed Nov. 23, 1994.

BACKGROUND OF THE INVENTION

The subject of the present invention is an ice nucleating agent and a process for preparing such an agent.

It is known that a product can be frozen in the presence of an ice nucleating agent, at a temperature greater than that where this product would have frozen spontaneously. Indeed, ice nucleating agents promote formation of ice crystals at a temperature greater than that where these crystals would have formed without the presence of nucleating agents. Thus, such agents are up until now used in processes for freezing products, especially food products, in order to reduce the quantity of energy necessary for the freezing of these products European Patent Application Publication No. 0 424 771 A1.

It is also known that ice nucleating agents can increase the size of ice crystals during the freezing of some products (Ryder, J. M. 1987, Thesis, p155, Rhode Island University). Indeed, the ice crystals present in a product frozen with an ice nucleating agent are larger than those present in the same product frozen without such an agent. These large ice crystals leave, moreover, an imprint in the European Patent Application Publication No. 0 424 771 A1 frozen products by modifying their texture. Furthermore, this modification can be stablilized by freeze-drying followed by heating of the frozen product. Thus, ice nucleating agents are up until now used for freezing products, especially food products, in order to give an advantageous texture to the final product (Agric. Biol. Chem., 50 (1), 169–175, 1986).

Most biological nucleating agents have been found in microorganisms or insects. However, it could be very useful to isolate an ice nucleating agent from plants, especially from edible plants, for their use for the freezing, texturing or cryoconcentration of products, such as food products for example.

The aim of the present invention is to respond to this need.

SUMMARY OF THE INVENTION

The ice nucleating agent according to the present invention is an ice nucleating agent obtained from sea buckthorn (Hippophae). It may be an aggregate comprising a protein part and a lipid part. Moreover, sea buckthorn may be in particular *Hippophae rhamnoides, Hippophae salicifolia, Hippophae tibetana* or *Hippophae neurocarpa*. It has been found that the raw juice of the sea buckthorn berries contains the ice nucleating agent and that the agent may be obtained and contained in an aqueous extract by aqueously extracting tissue of the berries and of the leaves.

All plants which are part of the genus Hippophae are sea buckthorns. Moreover, this shrub is widely distributed in Europe and in Asia, and has the advantage of producing numerous orange berries. Sea buckthorn is thus an abundant source of ice nucleating agent.

In addition to obtaining the ice nucleating agent by recovering raw juice from the berries, the present invention includes a process for obtaining the agent, wherein berry and/or leaf tissue is extracted with an aqueous solution containing a saccharide to obtain an aqueous extract part and a solids part and then the aqueous extract part is separated from the solids part to obtain the aqueous extract part containing the agent.

DETAILED DESCRIPTION OF THE INVENTION

Figure 1:
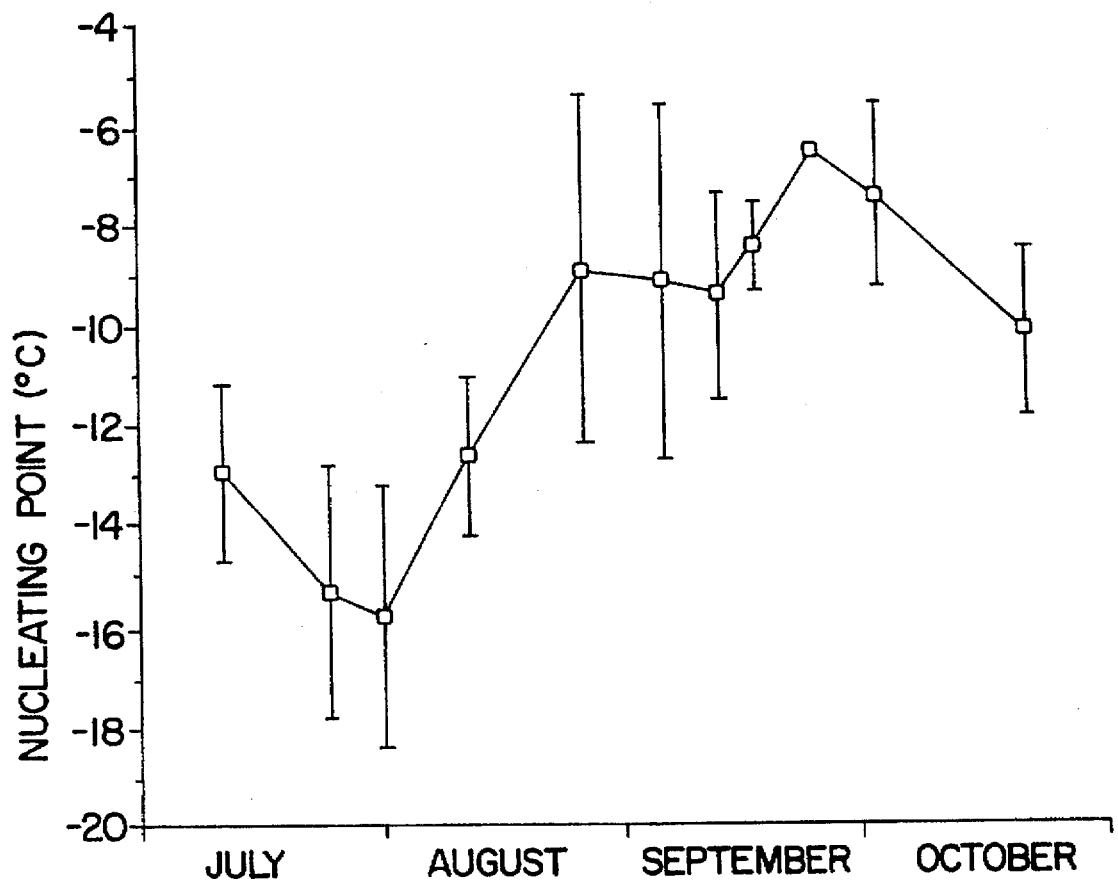

In this description, the term "agent" or "nucleating agent" is used in the sense of "ice nucleating agent".

In carrying out the invention, preferably, ripe sea buckthorn berries (that is to say berries which have ripened until they have an orange colour), and in particular sea buckthorn berries having a water content of 80% to 90%, are used for example. The berries can thus be ground or crushed by pressing or by centrifugation, and then the resulting raw juice can be recovered for use as an ice nucleating agent, for example.

As the tissues of the berry and in particular its outer coat contain a large quantity of nucleating agent, it is also possible to extract directly the berries with an extraction solution comprising pectin, mono-, oligo- and/or polysaccharides, and preferably with at least one of these solutions comprising, in water, 0.0001 to 2% by weight of pectins of all degrees of esterification, for example, or 0.0001 to 2% by weight of at least one of the other saccharides.

In particular, the extraction solution is chosen from the group consisting of solutions of alginates, polygalacturonic acid, amylose, amylopectin, polymannans, arabinose, galactose, lactose, glucose, fructose and sucrose.

In order to carry out this extraction, it is thus possible to crush or grind the berries, for example, to add to the volume of berries thus obtained 1 to 200 volumes of at least one of the said extraction solutions, but preferably 5 to 100 volumes, and then to allow the whole to react for 1 to 30 min at a temperature of 4 to 35° C., and finally to separate a solid part by centrifugation or by filtration of the mixture, for example, and to harvest a liquid part having a nucleating activity.

Preferably, the berries of the solid part of the extracted mixture are subjected to at least 1 new extraction as described above. For that, the berries of the solid part of the extraction mixture can be resuspended each time in one of the said extraction solutions, a solid part can then be separated and a liquid extract harvested. It has thus been possible to observe that the nucleating activity of the various successive extracts remains identical during at least the first 25 extractions. It is however preferable to first remove the raw juice from the berries before extracting therefrom the nucleating agent several times in succession. Indeed, this crude juice contains sugars, flavourings and proteins which are damaging to the nucleating activity.

Likewise, in order to obtain an extract from sea buckthorn leaves, leaves can be finely ground and then the nucleating agent extracted therefrom in the same manner as described above by at least one of the said saccharide composition solutions of pectin, mono-, oligo- and/or polysaccharide, for example.

Because the sea buckthorn berries are edible and traditionally used in the manufacture of liqueurs and jams, a crude extract of sea buckthorn berry can thus be used directly as natural additive for the preparation of food products, for the purpose of freezing them, texturing them or cryoconcentrating them, for example.

In a process for freezing a product, it is thus possible to add the said ice nucleating agent to a freezable product and to freeze the said product between −5° C. and −25° C. The advantage of using the agent according to the invention lies in the fact that it is possible to carry out the freezing at high temperatures between −5° C. and −10° C. for example, and that the additive is perfectly edible.

In another process for texturing food products, the said ice nucleating agent is added to a freezable product, the said product is frozen between −5° C. and −25° C., the said product is freeze-dried and then heated. The advantage of using the agent according to the invention lies in the fact that it is possible to carry out the freezing at high temperatures between −5° C. and −10° C., for example, that the additive is perfectly edible and that the crystals are large in size, bringing about, as a result, improved modification of the texture of the product.

Finally, it is also possible to cryoconcentrate a liquid, such as a coffee extract, a fruit juice or a vegetable juice, by adding thereto an extract comprising the agent according to the present invention, by freezing it between −5° C. and −10° C., and then by separating the crystalline phase from the liquid phase by centrifugation, for example. The advantage of using the agent according to the invention lies in the fact that it is possible to carry out the freezing at high temperature between −5° C. and −10° C. for example, that the additive is perfectly edible, that the crystals are large in size, bringing about, as a result, improved separation of the phases, and that the crystallization rate is relatively high thus accelerating as a result the whole cryoconcentration process.

BRIEF DESCRIPTION OF THE DRAWING FIGURE

The Drawing Figure illustrates ice nucleating activity of raw juice with reference to berry maturity.

TEST METHODS, EXAMPLES AND FURTHER DESCRIPTION WITH REFERENCE TO THE DRAWING FIGURE

The ice nucleating agent according to the present invention is described in greater detail by means of the various properties determined especially using various tests, as set out below. The percentages are given by weight, unless otherwise stated.

Measurement of the nucleating activity of sea buckthorn extracts obtain of juice and extracts of sea buckthorn berries:

Sea buckthorn (*Hippophae rhamnoides*) berries are harvested at maturity and then stored frozen at −40 ° C. until used. The juices and extracts are preserved at 4° C.

Extract 1 (crude berry juice): the berries are thawed, crushed and then centrifuged in an Eppendorf tube (5000 $g_n$, 10 min) at 20° C. The supernatant is used.

Extract 2 (ground berries): the frozen berries are intensely ground in a POLYTRON grinder for 5 min. The juice containing the berry skins is used.

Extract 3 (ground berry supernatant): the ground berries are centrifuged (5000 $g_n$, 10 min) at 4° C. The supernatant is used.

Extract 4 (ground berry pellet): after centrifugation of previously ground berries, the pellet is taken up in 3 volumes of water which are used.

Extracts 5 to 7: a pellet of ground and centrifuged berries is taken up in 25 volumes of a solution comprising 0.01, 0.1 or 0,5% pectin in water, the whole is allowed to react for 15 min while stirring occasionally, the mixture is centrifuged (10,000 $g_n$, 10 min), then the supernatant is used as extract.

Extracts 8 to 9: a pellet of ground and centrifuged berries is extracted in the same manner as for extracts 5 to 7 with 2 volumes of a solution comprising 0.001 or 0.0001% pectin in water.

Extracts 10 to 22: a pellet of ground and centrifuged berries is extracted in the same manner as for extracts 5 to 7, with respectively solutions comprising 0.1% pectin at various degrees of esterification (10%, 38%, 75%), or with solutions comprising respectively 0.1% polygalacturonic acid, 0.1% amylose, 0.1% amylopectin, 0.01% alginate, 1% polymannans (polysaccharide fraction of coffee), 0.1% galactose, 0.1% glucose, 0.01% arabinose and 0.01% sucrose.

Nucleating activity:

The nucleating activity of an agent present in a product is measured by measuring the temperature at which the product freezes. This temperature is called nucleating temperature. This temperature is then compared to that obtained with the product containing no agent (control). A nucleating activity is observed when the nucleating temperature of the product containing the agent is greater than that of the control product.

The nucleating activity can be characterized according to three temperatures: the ice nucleating temperatures (in °C.) T20, T50, T80 indicating that respectively 20%, 50% and 80% of the samples freeze at this temperature.

In the description which follows, the term "nucleating point" will be used in the sense of "nucleating temperature at which 50% of the samples are frozen", that is to say the T50 value.

Drop test: the above-mentioned samples 1 to 4 (10°) are diluted 10 to 1000 fold ($10^{-1}$ to $10^{-3}$) with double distilled water or a strawberry juice. Ten drops of 10 μl of extract are deposited on an aluminium foil coated with paraffin, and the foil is placed on a water bath cooled at a rate of 0.1° C. per minute. All the dilutions are on the same foil. The T20, T50 and T80 values are then determined.

The strawberry juice is prepared by centrifugation of fresh, previously washed strawberries (kitchen centrifuge) followed by a second centrifugation of the juice at 4° C. (10,000 $g_n$, 15 min). The supernatant is then stored frozen at −20° C., and then thawed before being used as model.

Glass tube test: 100 ml of the above-mentioned extracts 5 to 22, diluted 10 fold in double distilled water, are added to a thin-walled glass tube which is then placed in a water bath cooled at a rate of 0.1° C./min. The T20, T50 and T80 values are then determined.

Table 1 below presents for the above-mentioned samples 1 to 4 the results of the trials carried out according to the drop test.

As can be seen, a marked difference is observed between the nucleating temperatures of the samples (dilution up to $10^{-2}$) and that of the sample frozen without agent (control). In contrast, the nucleating activity of a raw berry juice diluted 1/1000 is relatively low. Furthermore, a variation is generally observed between the nucleating temperatures of the crude samples (10°) and those of the diluted samples. The high concentration of sugar in the crude samples would probably disrupt the nucleating activity of the agent.

TABLE 1

| Sample | Dilution | Double distilled water | | | Strawberry juice | | |
|---|---|---|---|---|---|---|---|
| | | T20 | T50 | T80 | T20 | T50 | T80 |
| 1 | $10^0$ | −7.3 | −7.4 | −7.9 | −6.7 | −7.0 | −7.1 |
| | $10^{-1}$ | −6.8 | −7.1 | −7.9 | −6.4 | −6.8 | −7.2 |
| | $10^{-2}$ | −6.8 | −8.9 | <−9 | −7.2 | −7.4 | −8.3 |

TABLE 1-continued

| | | Double distilled water | | | Strawberry juice | | |
|---|---|---|---|---|---|---|---|
| Sample | Dilution | T20 | T50 | T80 | T20 | T50 | T80 |
| 2 | $10^{-3}$ | <−9.0 | <−9.0 | <−9.0 | −7.5 | −8.5 | −9.0 |
| | $10^{0}$ | −7.3 | −7.7 | −7.9 | −6.7 | −6.9 | −7.0 |
| | $10^{-1}$ | −5.9 | −6.6 | −6.9 | −6.6 | −6.8 | −6.9 |
| | $10^{-2}$ | −6.2 | −7.7 | <−9.0 | −7.2 | −7.5 | −7.7 |
| | $10^{-3}$ | −6.8 | <−9.0 | <−9.0 | −7.1 | −7.7 | −8.4 |
| 3 | $10^{0}$ | −7.3 | −7.3 | −7.7 | −7.0 | −7.3 | −7.4 |
| | $10^{-1}$ | −6.4 | −6.7 | −7.3 | −7.2 | −7.4 | −7.5 |
| | $10^{-2}$ | −7.2 | −7.6 | −7.8 | −7.4 | −7.6 | −7.8 |
| | $10^{-3}$ | −8.0 | −8.9 | <−9.0 | −7.8 | −7.9 | −8.7 |
| 4 | $10^{0}$ | −5.9 | −6.5 | −6.6 | −5.7 | −6.0 | −6.2 |
| | $10^{-1}$ | −5.9 | −6.5 | −6.9 | −6.6 | −6.7 | −7.4 |
| | $10^{-2}$ | −6.4 | −6.8 | −8.7 | −7.5 | −7.9 | −8.2 |
| | $10^{-3}$ | −7.4 | −8.8 | <−9.0 | −8.4 | <−9.0 | <−9.0 |
| Control | $10^{0}$ | <−10 | <−10 | <−10 | −9.4 | <−10 | <−10 |

Table 2 below presents for extracts 5 to 22 the results of the trials carried out according to the glass tube test.

TABLE 2

| Extract No. | T20 | T50 | T80 |
|---|---|---|---|
| 5. 0.5% pectin | −5.0 | −5.0 | −5.5 |
| 6. 0.1% pectin | −5.0 | −5.0 | −5.5 |
| 7. 0.01% pectin | −5.0 | −5.0 | −5.5 |
| 8. 0.001% pectin | −5.5 | −5.5 | −5.5 |
| 9. 0.0001% pectin | −5.5 | −5.5 | −5.5 |
| Controls | | | |
| Extract No. 5 filtered using a 0.45 μm membrane | −5.5 | −5.5 | −5.5 |
| 0.5% pectin solution | −9.5 | −11.5 | −12 |
| Filtered 0.5% pectin solution (0.45 μm) | −9.0 | −11.5 | −12 |
| 10. 0.1% pectin (10% of esters) | −5.5 | −5.5 | −6.0 |
| 11. 0.1% pectin (38% of esters) | −5.0 | −5.0 | −5.5 |
| 12. 0.1% pectin (75% of esters) | −5.5 | −5.5 | −5.5 |
| 13. 0.1% polygalacturonic acid | −5.0 | −5.5 | −5.5 |
| 14. 0.1% amylose | −5.5 | −6.0 | −6.5 |
| 15. 0.1% amylopectin | −5.5 | −6.0 | −6.0 |
| 16. 0.01% alginate | −5.0 | −5.5 | −5.5 |
| 17. 0.1% polymannan | −5.5 | −5.5 | −6.5 |
| 18. 0.1% galactose | −4.5 | −5.0 | −5.0 |
| 19. 0.1% lactose | −5.0 | −5.0 | −5.0 |
| 20. 0.1% glucose | −5.0 | −5.0 | −5.0 |
| 21. 0.01% arabinose | −5.0 | −5.0 | −5.0 |
| 22. 0.01% sucrose | −5.0 | −5.0 | −5.5 |

As can be seen in Table 2 above, the extracts produced with the aid of a solution of pectin, polysaccharide or sugar have a mean nucleating temperature of the order of −5.5° C. For comparison, a pure solution of pectin, filtered or otherwise using a membrane of porosity 0.45 μm (Sartorius), has a nucleating temperature of less than −10° C.

Furthermore, a berry extract produced with the aid of a solution of pectin which is filtered using a membrane of porosity of 0.45 μm retains a nucleating activity of −5.5° C. This therefore suggests that the activity is not linked to the presence of a microorganism present in or at the surface of the berry.

Finally, when the extraction of a pellet of ground and centrifuged berries is repeated several times in succession using each time 12.5 volumes of an aqueous solution comprising 0.1% pectin, for 15 min followed by a centrifugation, a good nucleating activity is still observed in the 25th extract. Table 3 below presents the nucleating activity of the successive extracts obtained in this manner, which activity is determined according to the glass tube test.

TABLE 3

| Nth berry tissue extract | T20 | T50 | T80 |
|---|---|---|---|
| 5 | −5.0 | −5.5 | −5.5 |
| 10 | −5.0 | −5.5 | −5.5 |
| 15 | −5.0 | −5.5 | −6.0 |
| 20 | −5.5 | −6.5 | −7.0 |
| 25 | −5.5 | −6.0 | −6.5 |
| 30 | −5.5 | −7.0 | −7.5 |

Nucleating activity dependent on the maturity of the berry:

The seasonal nucleating activity of a juice from sea buckthorn (*Hippophae rhamnoides*) berries harvested in the locality of Trondheim (Norway) is measured.

At the beginning, towards mid-July, the berries are small and green, containing very little juice. Accordingly, the July and August samples are prepared by mixing the berries with a volume of deonized water and then by crushing them with the aid of a mortar, whereas the samples for the months of September to October of orange colour are prepared by crushing the berries with the aid of a mortar (without adding water). The samples employed are obtained after centrifugation of the prepared samples (5,000 $g_n$, 10 min) and filtration of the supernatant through a filter of porosity 0.45 μm. The nucleating point of the extracts is finally determined according to the abovementioned method.

The drawing figure illustrates the variation of the nucleating point as a function of the date on which the abovementioned berries were harvested.

It is observed that the best nucleating activity relates to the berries from the months of September and October, therefore to the ripe berries, of orange colour.

The degree of maturity of the berries can also be assessed more precisely by measuring their water content, using means known to a person skilled in the art. This measurement was carried out for the above-mentioned berries from July to October: the best nucleating activity was found in the berries of the month of September, which present a water content of between 80% and 90%.

Nucleating activity of sea buckthorn leaves

Sea buckthorn (*Hyppophae rhamnoides*) leaves are ground and the nucleating agent is extracted therefrom using a solution of pectin or sugar in the same manner as described for the preparation of the berry extracts having the numbers 5 to 22 above.

In all cases, the mean nucleating activity of the leaf extracts determined by the glass tube test is of the order of −5.5° C. The sea buckthorn leaves are therefore also not a negligible source of nucleating agents.

Purification, characterization

The nucleating agent from sea buckthorn can be purified by the method below, for example. The agent can then be characterized by various methods.

Sea buckthorn (*Hyppophae rhamnoides*) berries are pressed by centrifugation and ⅓ of the volume of distilled water is added to the juice. The mixture is then centrifuged (5,000 $g_n$, 10 min), then the supernatant is filtered on a membrane of porosity 0.45 μm (Minisart, Sartorius). The filtrate is then loaded onto a gel filtration column 2.6×60 cm containing a Sephacryl HR 300 resin, and eluted at 4° C. with a 0.05M Tris buffer of pH 7.5 (240 ml/h). The first elution peak has nucleating activity (it is known that for this type of column, the volume of eluate corresponding to the first elution peak contains molecules of very high molecular weight).

The nucleating agent therefore comes from the sea buckthorn and not from a bacterium present in the berry (filtration on a membrane of porosity 0.45 μm). Furthermore, this agent is a molecule of high molecular weight.

The eluate containing the nucleating agent is then analysed by polyacrylamide gel electrophoresis. The SDS-PAGE electrophoresis (in the presence of SDS') reveals the presence of a protein with an apparent molecular weight of 25 to 27 kD (kilodalton).

Finally, PAGE electrophoresis (without SDS) on a large-porosity gel proves to be impossible, in spite of the pretreatment of the eluate with chloroform in order to remove lipid from the protein and in spite of the use, in the gel, of non-ionic detergent (0.5% Triton X-100) or of 7M urea.

Consequently, the nucleating agent is probably an aggregate of high molecular weight which comprises a protein part which can be attached to cellular structures which are too small to be retained on a 0.45 μm filter, but too large to migrate in a non-denaturing polyacrylamide gel. Furthermore, these cellular structures could also participate in the nucleating activity. Finally, the protein part is a protein which comprises subunits with an apparent molecular weight of 25 to 27 kD.

Inactivation

The nucleating agent is subjected to chemical treatments in order to determine the structures which are essential for the nucleating activity.

A lipid-removing treatment is performed on the purified nucleating agent. For that, 2.5 volumes of chloroform are mixed with 1 volume of purified agent, the mixture is stirred, it is allowed to stand for 24 hours at 4° C., then the chloroform is extracted by the action of air bubbles. A fraction containing lipid-free agent and a fraction containing lipids are thus obtained. When the nucleating activities of the purified agent and 4° C. the lipid-free agent are compared, a decrease of 4° C. in the nucleating point is observed following the lipid-removing treatment. Lipids therefore seem to play a role in the nucleating activity.

Furthermore, if the lipid fraction is mixed with the fraction containing the lipid-free agent for 14 days at 4° C., and then the nucleating activities of the mixture and of the fraction containing the lipid-free agent compared, an increase in the nucleating point of 3° C. is observed. Consequently, lipids contribute to the production of a high nucleating activity.

The nucleating agent may therefore also comprise a lipid part.

The effect of mercaptoethanol and of 0.01M SDS is measured at various pH values, on crude berry extracts. Mercaptoethanol has no effect on the nucleating point, which indicates that disulphide bridges are not essential for the nucleation. And the effect of SDS on the nucleating point is relatively limited (0° to 1° C. according to the pH), which indicates that the positive charges at the surface of the agent are not essential for the nucleating activity (SDS adds an excess of negative charge to the protein and thereby masks the positive charges present at the surface of the protein). Likewise, the pH appears not to influence the behaviour of the nucleating agent.

Finally, the action of N-bromosuccinimide (NBS) on the nucleating point of the agent is analyzed. The mixture of purified nucleating agent and NBS (final concentration 0.001M) is adjusted to pH 3.0 by adding small quantities of 2M HCl, and it is then left for 30 minutes at 25° C. before being readjusted to pH 7.5 by adding small quantities of a Tris buffer. The determination of the nucleating point before and after treatment reveals a decrease of 2.8° C. in this point. This indicates that aromatic amino acids are important for the nucleating activity (NBS oxidizes the indole groups and the tyrosines).

The following examples are presented by way of illustration of the various industrial applications of the nucleating agent according to the present invention, in a process for freezing freezable products, in a process for freeze-texturing a freezable food product, and in a process for concentrating a food liquid.

EXAMPLE 1

A raw juice from ripe sea buckthorn berries is prepared by grinding the berries and then by recovering the supernatant therefrom after centrifugation.

It is then added to an ice cream, during its preparation in a traditional manner, in an amount of 1 volume per 600 volumes of ice cream. Then the cream is frozen at −8° C.

For comparison, an ice cream prepared in a traditional manner, without addition of a sea buckthorn berry juice, is frozen at −12° C.

EXAMPLE 2

A sea buckthorn berry extract is prepared by first grinding berries, then by adding thereto 10 volumes of a 0.1% solution of pectin which is allowed to react for 15 min, then by centrifuging the mixture at 10,000 g for 10 min so as to recover the supernatant therefrom.

The sea buckthorn berry extract thus prepared is then added to a meat mousse, during its preparation in a traditional manner, in an amount of 1 volume per 100 volumes of meat mousse. Then the meat mousse is frozen at −10° C.

For comparison, a meat mousse prepared in a traditional manner, without addition of a sea buckthorn berry extract, is frozen at −15° C.

EXAMPLE 3

A soya bean protein paste is prepared by heating at 70° C. for 10 minutes a soya bean protein isolate containing 20% protein, then by cooling the solution to 20° C. The sea buckthorn berry juice described in Example 1 is added to this paste in an amount of 1 volume per 100 volumes of this paste. The paste which is present in the form of a thin layer 2 to 5 mm thick is frozen at an average rate of the order of 0.1° C./min down to −20° C., then this temperature is maintained for 10 hours. Finally, in order to stabilize the paste texture modification, it is freeze-dried and then heated at 100° C. for 2 minutes. The soya bean paste then has a fibrous and lamellar texture. This texture is very similar to the texture of "cornflakes".

For comparison, the same paste composition is frozen without raw berry juice, freeze-dried and then heated under the same conditions as above. A paste having a spongy and disorganized texture which is not at all similar to the texture of "cornflakes" is thus obtained.

EXAMPLE 4

0.03% of the sea buckthorn berry juice described in Example 1 is added to a coffee extract comprising 10% dry matter. The mixture is cooled at −6.5° C. for 30 min, then centrifuged at 2,000 g for 15 min at −5° C., and the supernatant is harvested. The liquid phase is thereby separated from the crystalline phase of the mixture and a coffee extract comprising 15.3% dry matter is thus obtained.

For comparison, the same coffee extract comprising 10% dry matter does not freeze in the absence of the nucleating agent according to the present invention.

We claim:

1. A process for increasing the temperature at which a food product freezes comprising adding to a food product a substance selected from the group consisting of juice obtained from berries of sea buckthorn and an aqueous extract obtained from sea buckthorn tissue selected from the group consisting of berry tissue and leaf tissue.

2. A process for preparing a food product which during preparation is subjected to a temperature for freezing the food product comprising adding to a food product a substance selected from the group consisting of juice obtained from berries of sea buckthorn and an aqueous extract obtained from sea buckthorn tissue selected from the group consisting of berry tissue and leaf tissue and then cooling the food product containing the added substance to a temperature for freezing the food product containing the added substance.

3. A process according to claim 1 or 2 wherein the substance is an extract obtained from sea buckthorn berry tissue.

4. A process according to claim 3 wherein the berry tissue is tissue obtained from sea buckthorn berries having a water content of from 80% to 90%.

5. A process according to claim 1 or 2 wherein the substance is obtained from sea buckthorn berries having a water content of from 80% to 90%.

6. A process according to claim 2 wherein the food product containing the added substance is cooled to a temperature between −5° C. and −25° C.

7. A process according to claim 6 wherein the substance is an extract obtained from sea buckthorn berry tissue.

8. A process according to claim 2 wherein the food product containing the added substance is cooled to a temperature between −5° C. to −10° C.

9. A process according to claim 2 wherein the food product containing the added substance is cooled to a temperature for obtaining a frozen product for freeze-drying and further comprising freeze-drying the frozen product to obtain a dried food product.

10. A process according to claim 9 wherein the substance is an extract obtained from sea buckthorn berry tissue.

11. A process according to claim 9 or 10 wherein the food product is a soy bean protein isolate.

12. A process according to claim 2 wherein the food product containing the added substance is cooled to a temperature for freezing so that a crystalline phase contained in a liquid phase is obtained and further comprising separating the liquid phase from the crystalline phase to obtain a concentrated liquid phase food product.

13. A process according to claim 12 wherein the substance is an extract obtained from sea buckthorn berry tissue.

14. A process according to claim 12 or 13 wherein the food product is a liquid coffee extract.

15. A process according to claim 12 or 13 wherein the food product is selected from the group consisting of fruit juice and vegetable juice.

16. A process according to claim 2 wherein the food product is an ice cream composition and the substance is added during preparation of the ice cream composition and then freezing the composition and added substance.

* * * * *